US012774671B2

(12) United States Patent
Ruiz et al.

(10) Patent No.: US 12,774,671 B2
(45) Date of Patent: Oct. 27, 2026

(54) APPARATUS FOR PROTECTING A CATALYTIC CONVERTER

(71) Applicant: RB Distribution, Inc., Colmar, PA (US)

(72) Inventors: Ricardo Llorente Ruiz, Perkasie, PA (US); Daniel E. Theobold, Center Valley, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/302,314

(22) Filed: Apr. 18, 2023

(65) Prior Publication Data

US 2024/0352882 A1 Oct. 24, 2024

(51) Int. Cl.
*F01N 3/28* (2006.01)
*F16L 3/12* (2006.01)

(52) U.S. Cl.
CPC .......... *F01N 3/2839* (2013.01); *F16L 3/1211* (2013.01); *F01N 2260/22* (2013.01)

(58) Field of Classification Search
CPC ....... F16L 3/1066; F16L 3/1211; F16L 33/04; F16L 33/12; F16L 23/08; F16L 23/10; F16L 33/06; F16L 33/23; F16L 55/172; F16L 3/1041
USPC ........................................ 24/279–286, 135 K
See application file for complete search history.

(56) References Cited

U.S. PATENT DOCUMENTS

| | | | | |
|---|---|---|---|---|
| 2,178,819 | A * | 11/1939 | Timm | F16L 23/10 285/411 |
| 2,706,648 | A * | 4/1955 | Gosse | F16L 23/06 24/271 |
| 3,006,025 | A * | 10/1961 | Duban | E05D 7/1005 16/263 |
| 3,600,770 | A * | 8/1971 | Halling | B65D 45/32 285/411 |
| 3,944,265 | A * | 3/1976 | Hiemstra | F01N 13/1805 29/505 |
| 4,148,456 | A * | 4/1979 | Garchinsky | G08G 1/095 248/219.4 |
| 4,341,406 | A * | 7/1982 | Abbes | F16L 23/10 285/411 |
| 4,400,018 | A * | 8/1983 | Abbes | F16L 23/10 285/31 |
| 5,275,368 | A * | 1/1994 | Hall | H01F 27/06 248/230.9 |
| 7,025,308 | B1 * | 4/2006 | Hill | F24F 13/0254 248/62 |
| 7,971,676 | B2 | 7/2011 | Dusa, II | |
| 8,002,232 | B2 | 8/2011 | Meislahn | |
| 8,191,840 | B2 * | 6/2012 | Jenestreet | F21V 21/116 24/20 R |
| 8,453,784 | B2 | 6/2013 | Dusa, II | |
| 8,963,699 | B2 | 2/2015 | Potter | |
| 9,039,044 | B1 * | 5/2015 | Baldwin | F16L 57/00 285/45 |
| 10,197,190 | B1 * | 2/2019 | Neff | E21B 17/1035 |

(Continued)

*Primary Examiner* — Christopher Garft
(74) *Attorney, Agent, or Firm* — Volpe Koenig

(57) ABSTRACT

An apparatus for protecting a component of an exhaust system using a hinged clamp. The clamp has grouped links that are joined by hinge pins that fit within apertures in the links and the grouped links are movable relative to each other about the hinges. A closer that draws the ends of selected links together is also disclosed.

10 Claims, 11 Drawing Sheets

(56) References Cited

U.S. PATENT DOCUMENTS

| | | | |
|---|---|---|---|
| D879,008 | S | 3/2020 | Pringle |
| 2008/0295287 | A1 * | 12/2008 | Hetherington ........ E05D 7/1005 16/262 |
| 2014/0062111 | A1 * | 3/2014 | Biggert ..................... B66C 1/44 294/106 |
| 2015/0267855 | A1 * | 9/2015 | Bradberry ........... F16L 55/1725 285/15 |
| 2021/0253062 | A1 | 8/2021 | Tamagni |
| 2022/0397215 | A1 | 12/2022 | Archer |

* cited by examiner

APPARATUS FOR PROTECTING A CATALYTIC CONVERTER

BACKGROUND

Modern exhaust systems often include a catalytic converter as part of the required system. These catalytic converters typically include precious metal and rare earth elements that make them expensive. This inclusion of precious metal and rare earth elements have spawned a new form of theft that is based on cutting the catalytic converter from the vehicle's exhaust system. There have been a number of attempts to address this issue with theft deterrents. These prior attempts have provided devises that: are difficult to install; may trap heat that can create a fire hazard; or, trap road debris.

SUMMARY

The present apparatus includes a layered and hinged clamp that is easily installed; has a reduced profile; and, has a limited impact on air flow around the catalytic converter.

DETAILED DESCRIPTION

Illustrative embodiments of a catalytic convertor theft determent will be described with reference to the above described drawings.

Figure 1:
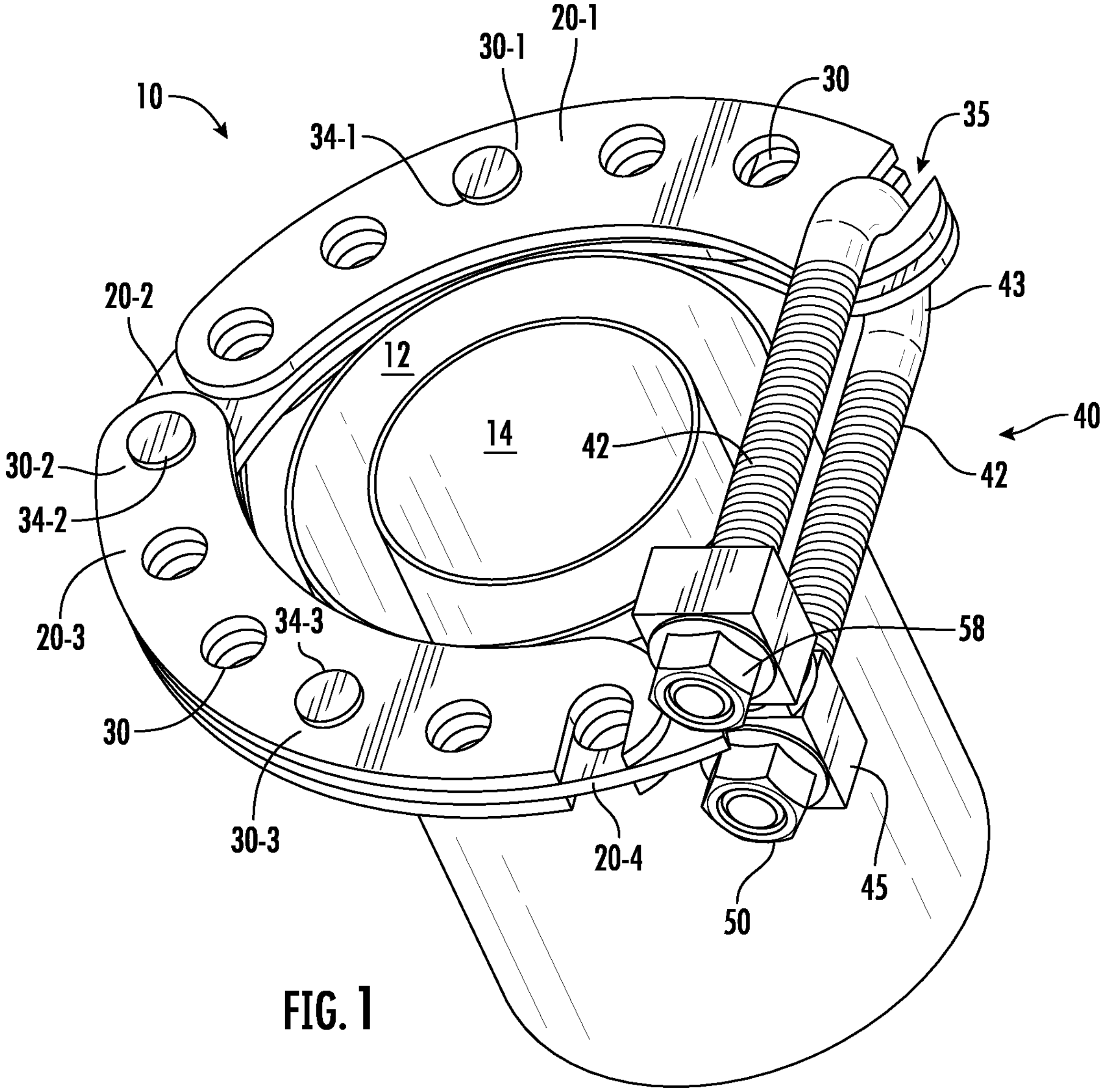
FIG. 1 illustrates the clamp positioned about both a larger diameter and a smaller diameter exhaust pipe.
Figure 9:
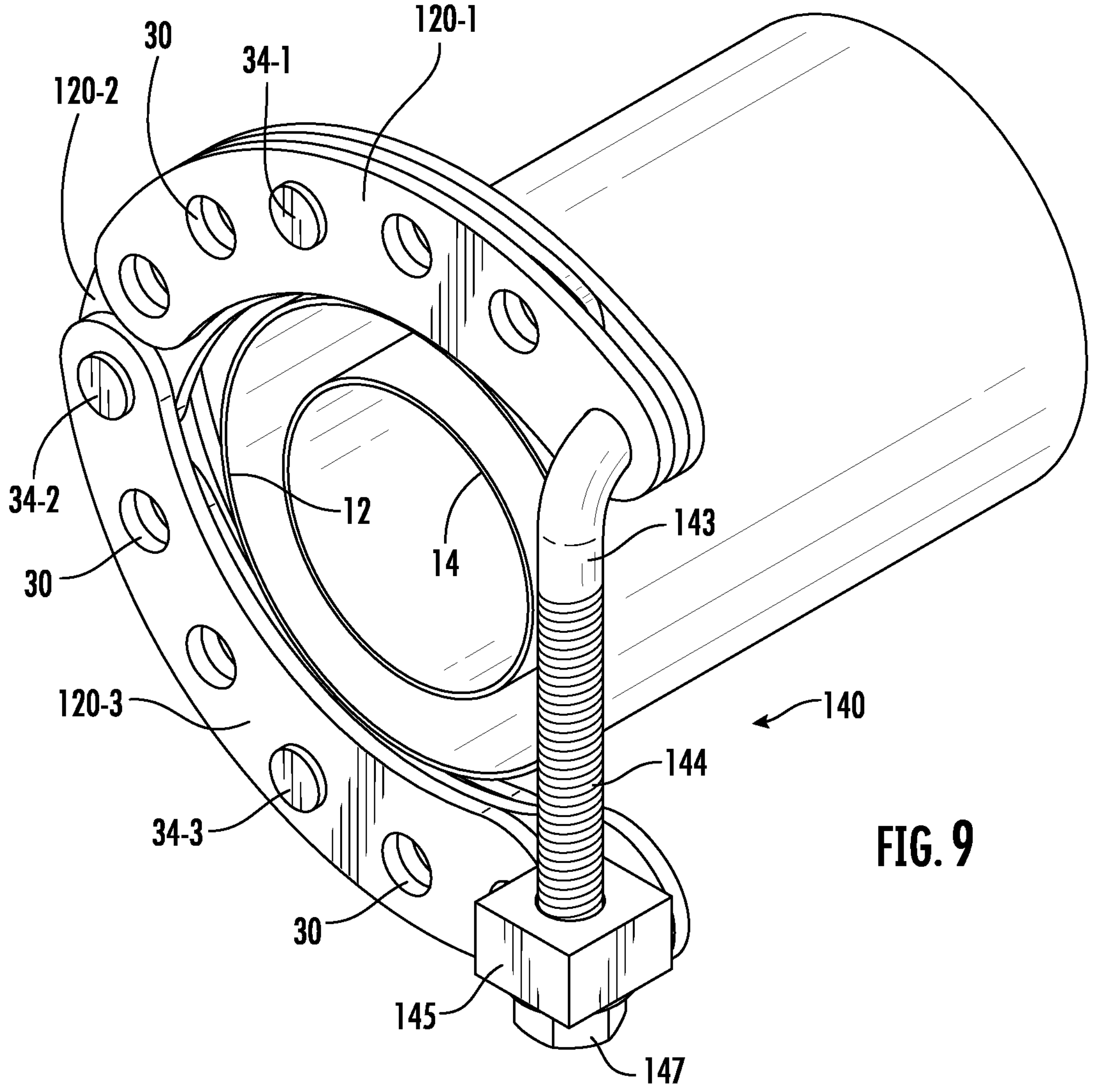
FIG. 9 illustrates the second embodiment of FIG. 6 positioned about both a larger diameter and a smaller diameter exhaust pipe.
Figure 10:
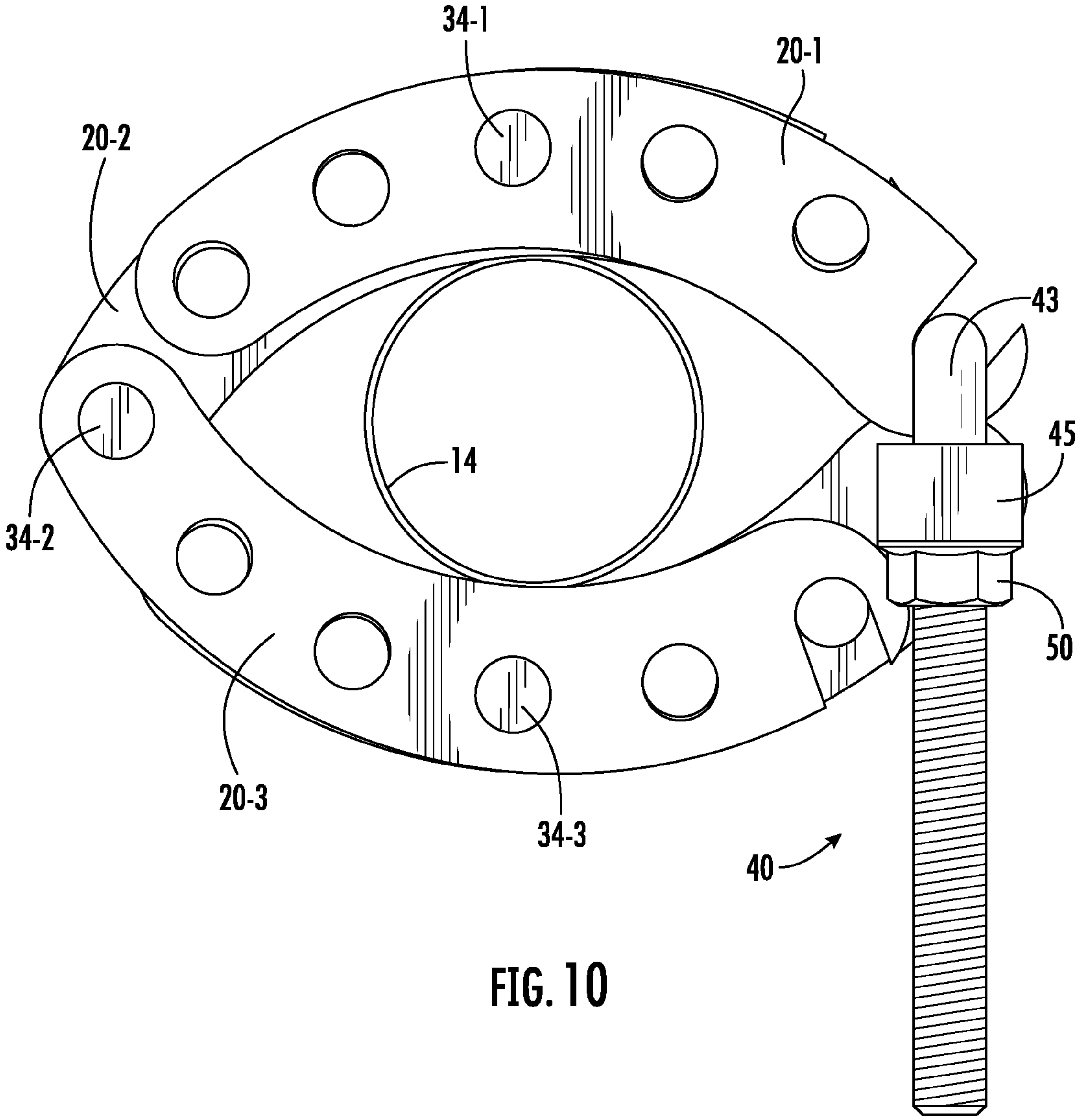
FIG. 10 illustrates the clamp of FIG. 1 closed clamp on a smaller diameter exhaust pipe.

With reference now to FIG. 1, the apparatus includes a hinged clamp 10 constructed of multiple arcuate links that are layered together. In the illustrated clamp 10, the individual links 20-1, 20-2, 20-3, and 20-4 have a common structure with a plurality of apertures 30 and an end 35 that is configured to receive a closer 40. The clamp 10 is illustrated in FIGS. 1 and 9 around a large diameter exhaust pipe 12 and a smaller diameter exhaust pipe 14.

The links 20-1, 20-2, 20-3, and 20-4 are joined in a hinged clamp 10 by individual hinge pins 34 that pass through aligned apertures 30 in the layered links. The links 20-1 and 20-2 are joined by the hinge pin 34-1. The links 20-3 and 20-4 are joined by hinge pin 34-3. The link 20-2 and 20-3 are joined by the hinge pin 34-2, which forms the central hinge for the clamp 10.

This hinge pin structure permits movement of the links within a group of links and movement between the groups of links. This provides flexibility and enables use of the same clamp 10 on larger diameter pipes, like 12, and smaller diameter pipes, like 14. Placing the hinge pins 34-1 and 34-3 at least one aperture in from the free ends provides a more even and distributed clamping pressure.

Figure 2:
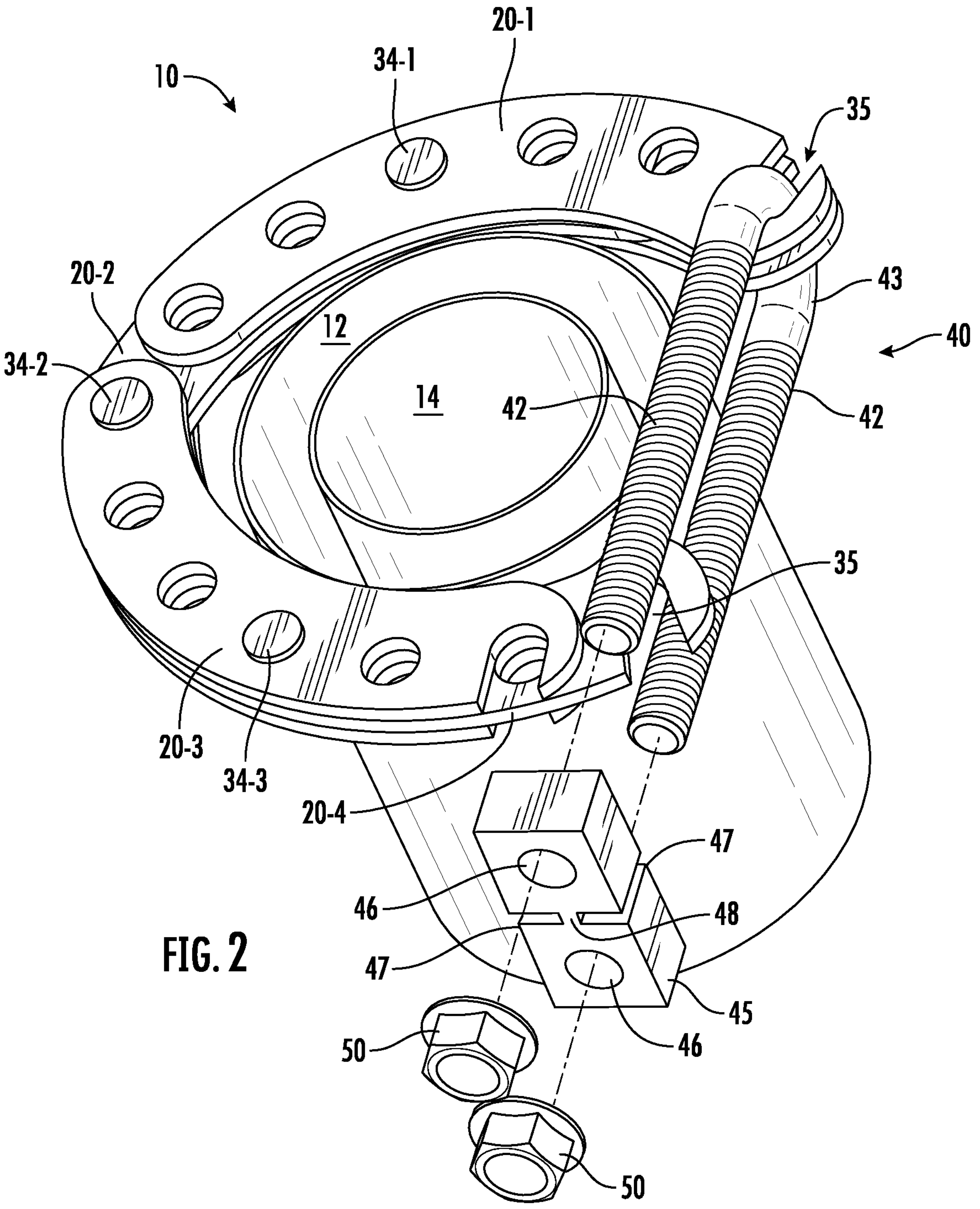
FIG. 2 illustrates an exploded view of the clamp and closer in FIG. 1.
Figure 3:
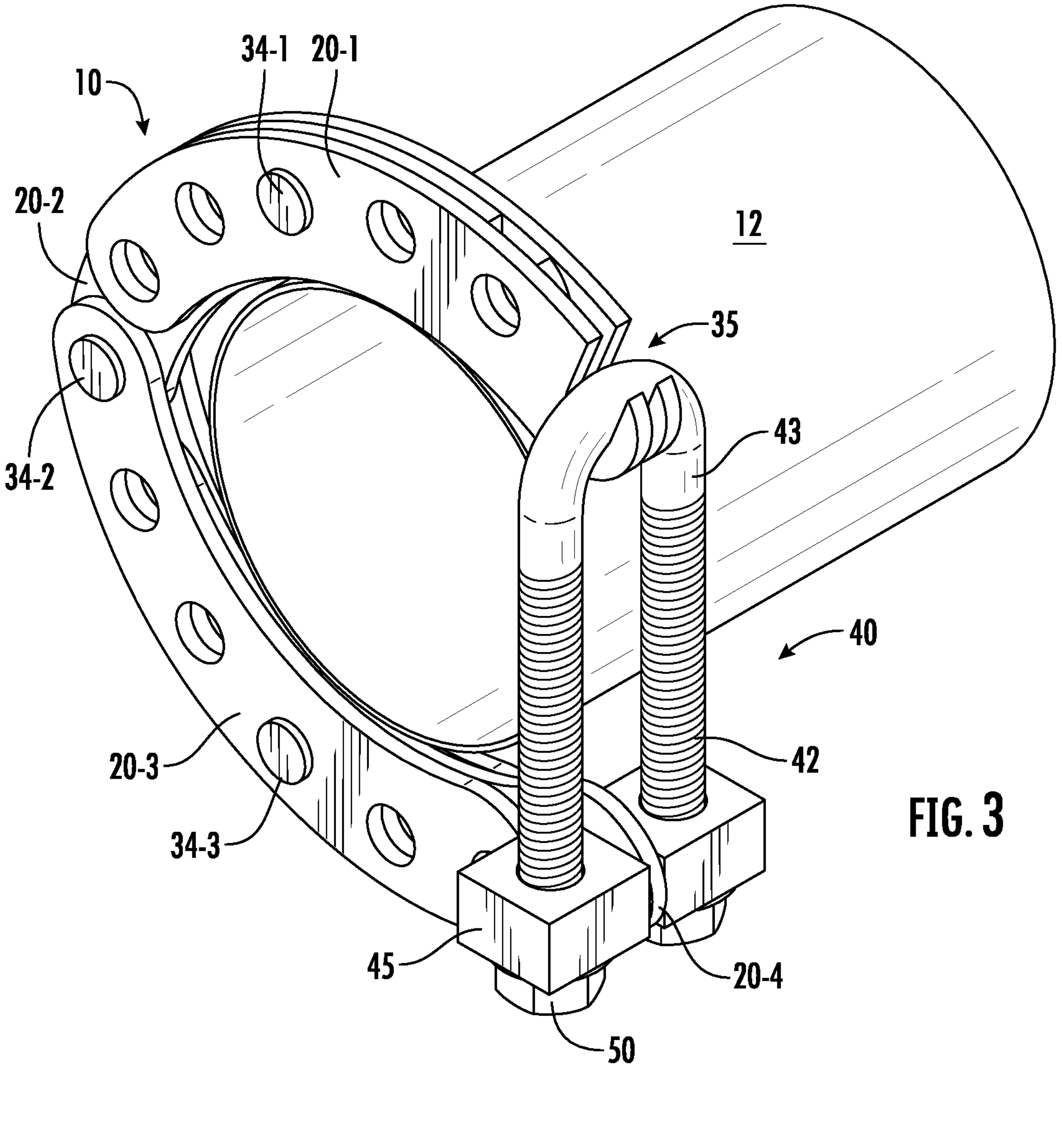
FIG. 3 illustrates the clamp of FIG. 1 closed about a larger diameter pipe.
Figure 4:
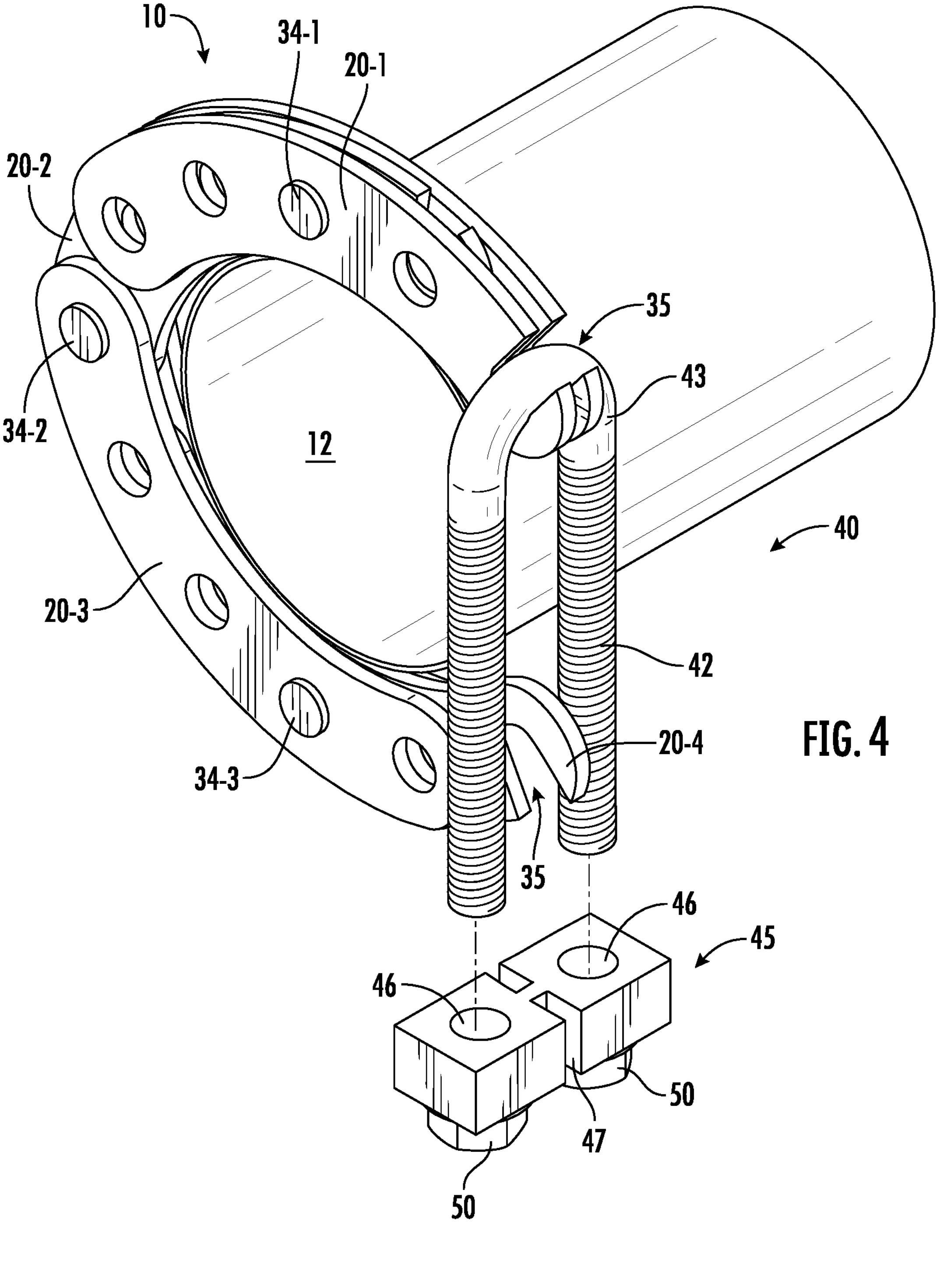
FIG. 4 illustrates the clamp of FIG. 1 with an opened closer.
Figure 5:
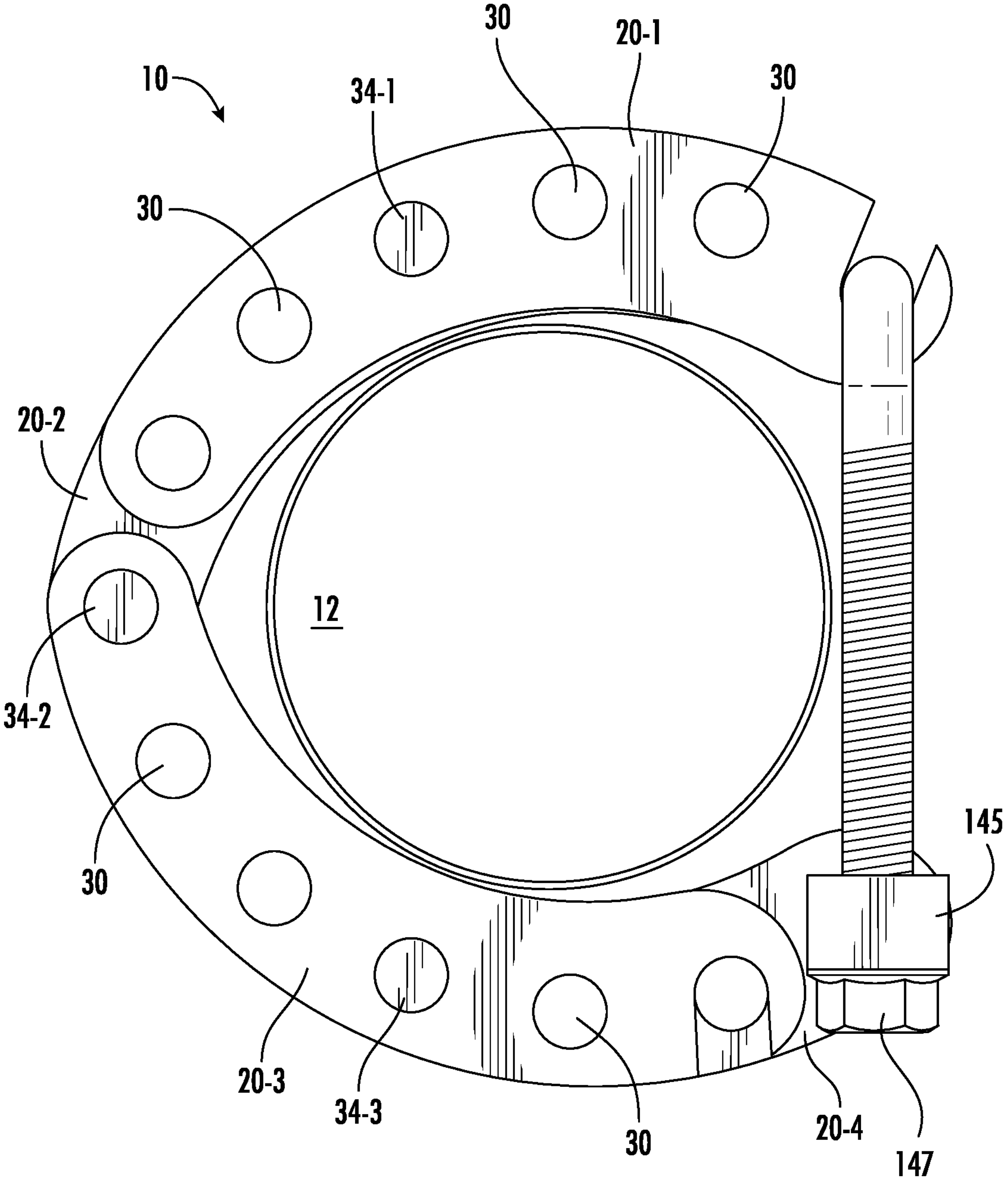
FIG. 5 is a plan view of the illustration in FIG. 3.

With reference to FIGS. 1 and 2, the closer 40 is generally "U" shaped to form and arch 43 with threaded shafts 42 that depend from the arch 43. The arch 43 is dimensioned to fit in the end 35 of the links 20-1. Which is hook shaped and engages the links 20-1. The securing collar 45 has apertures 46 that are spaced apart and dimensioned for the treaded shafts 42 to pass through. The two recesses 47 in securing collar 45 are between the holes 46 and create an interior divider 47. In use, the securing collar 45 moves up the shafts 42 and the interior divider 47 of the securing collar 45 is received in the end 35 of the link 20-4. Tightening element or nuts 50 on shafts 42 causes the fee ends of the clamp 10 to be drawn together and tighten around the exhaust pipe. FIGS. 3, 4 and 5 illustrate closing the clamp 10 on a larger diameter pipe.

FIGS. 6 through 9 illustrate another embodiment of a clamp 110 with another embodiment of a closure element 140 on a larger diameter pipe 12. In this embodiment of the clamp 110, the clamp is constructed of multiple links as described in the prior embodiment; however, the illustrated embodiment has five apertures 130 in each of the links 120. The individual links 120-1, 120-2, 120-3, and 120-4 have a common structure with a plurality of apertures 130 and an end 135, which is a closed end in this embodiment, that is configured to receive the closer 140.

Figure 6:
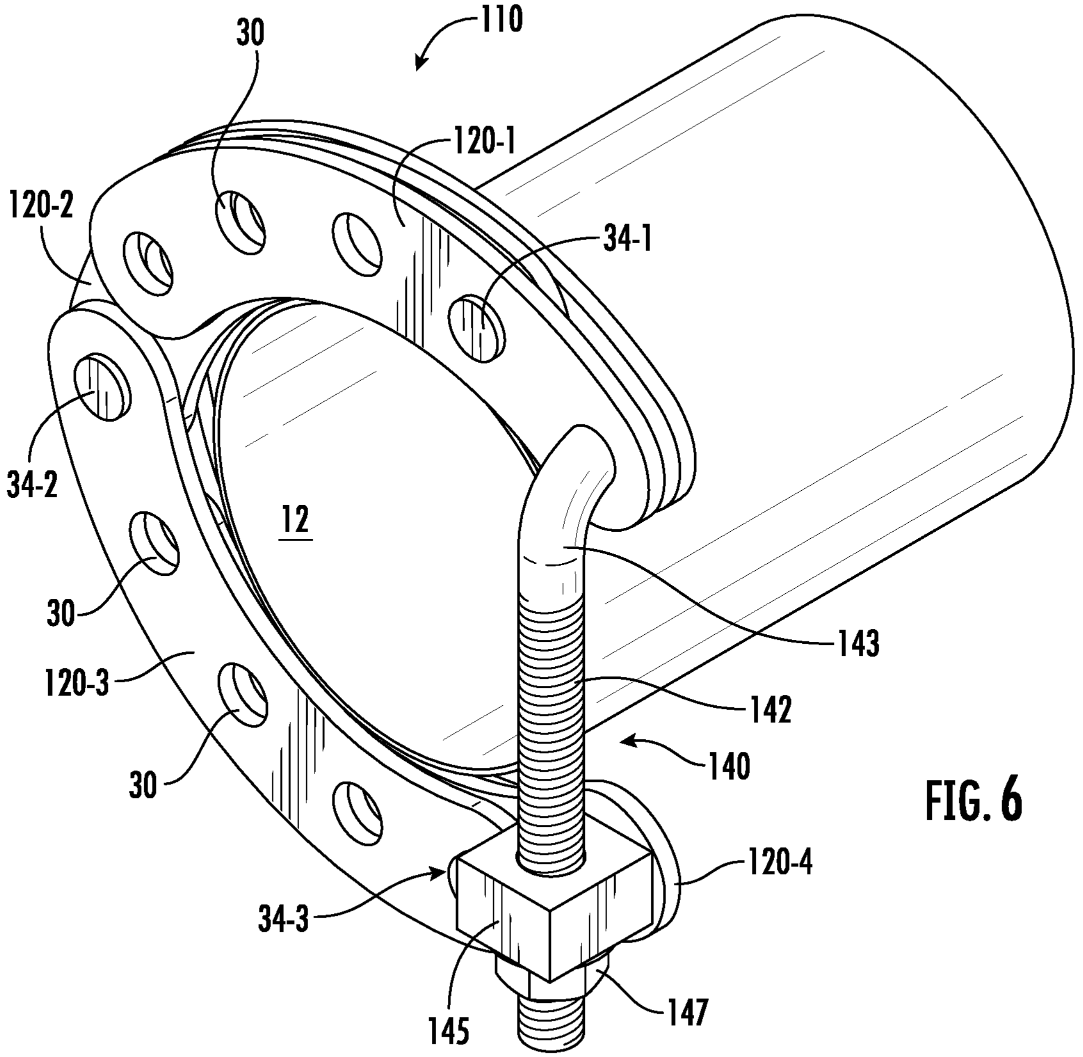
FIG. 6 illustrates another embodiment of the clamp and closer.

With reference to FIG. 6, the closer element 140 has a threaded shaft 144 passes through at least one link and is turned to be parallel with the clamp 110 by the arch 143 so the enlarger head 142 abuts against the link. A joining collar 145 with an open bore is secured to the end link 120-4 by and the enlarged head 146 abuts the link. When the ends of the clamp 110 are brought together, the closer element 140 passes through the joining collar 145 and fastening element or nut 147 mates with the threads 144 closes the clamp.

Figure 7:
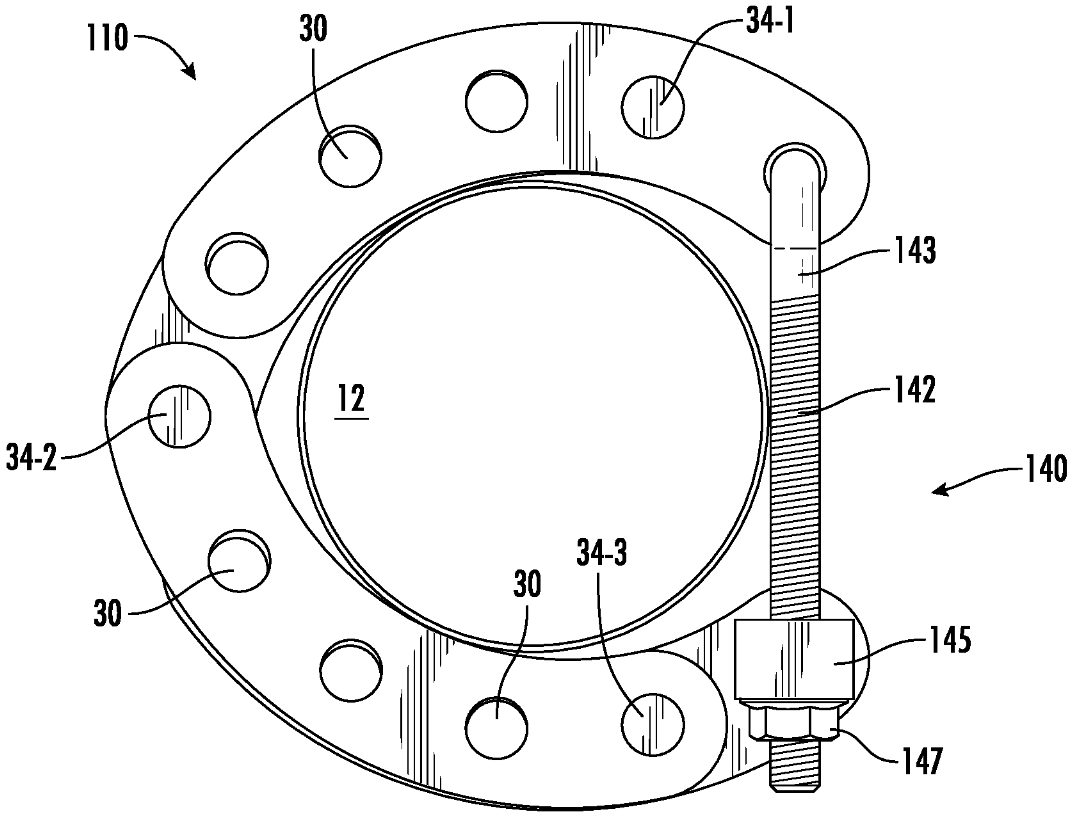
FIG. 7 is a plan view of the clamp and closer in FIG. 6.
Figure 8:
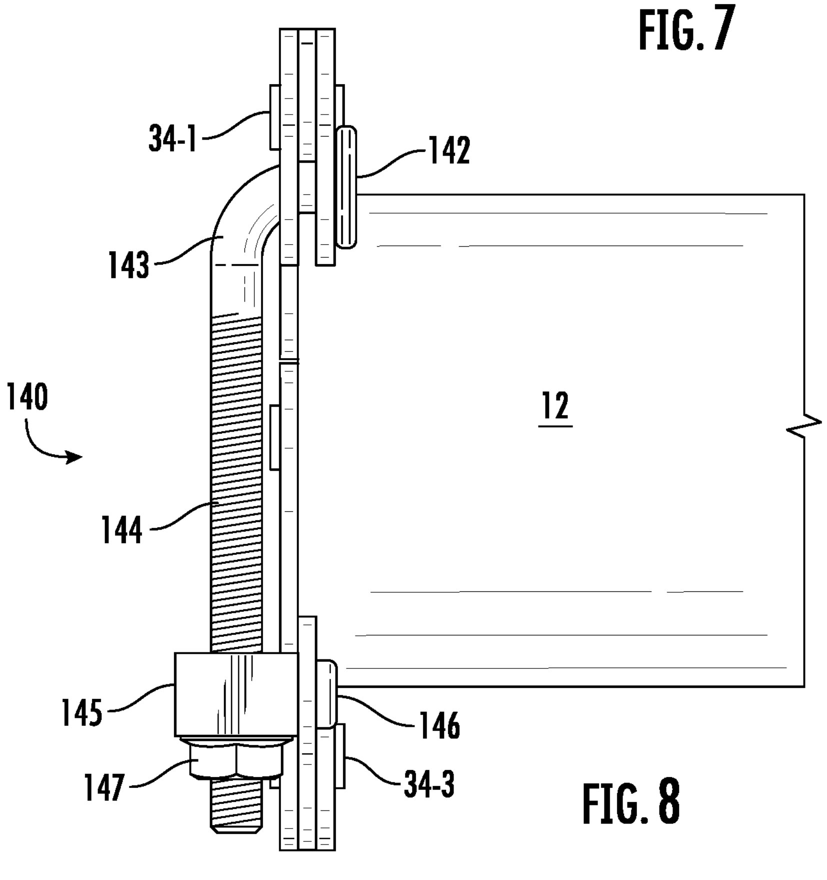
FIG. 8 is a side view of the clamp and closer in FIG. 6.

FIGS. 7 and 8 illustrate the clamp 110 about a larger diameter pipe 12. FIG. 8 illustrates the clamp 110 closed about a larger diameter pipe 12 and a smaller diameter pipe 14. In the embodiment illustrated in FIGS. 6-9, each link 110 has six apertures 130, which are all closed links.

Figure 11:
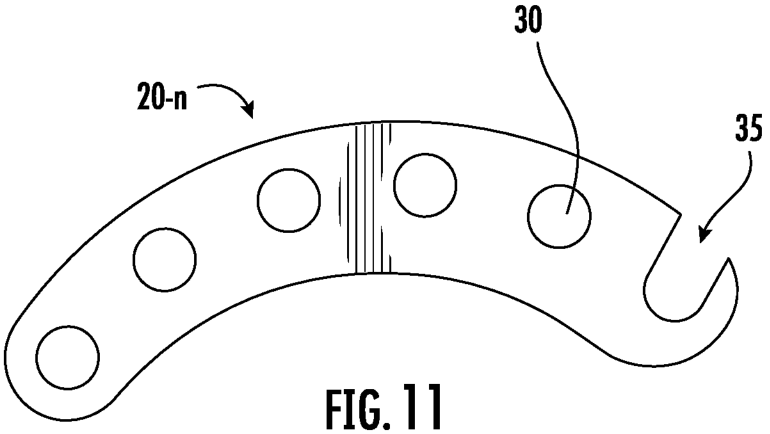
FIG. 11 illustrates a link suitable for assembling a hinged clamp as illustrated in FIG. 1.

FIG. 11 illustrates a link 20 with five apertures 30 and an open aperture that forms the end 35.

Figure 12:
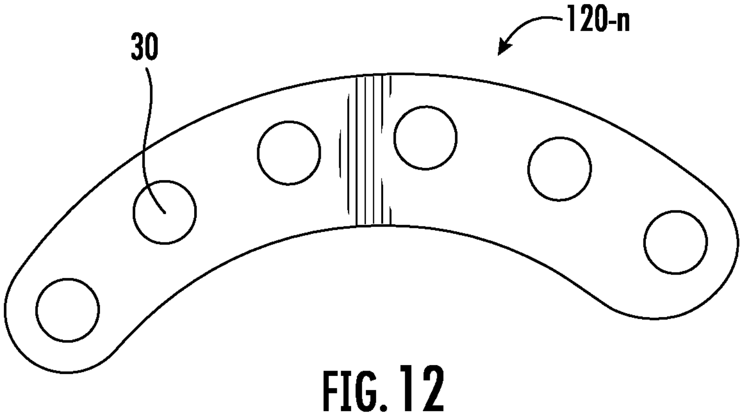
FIG. 12 illustrates a link suitable for assembling a hinged clamp as illustrated in FIG. 6.

FIG. 12 illustrates a link 120 with six closed apertures.

Figure 13:
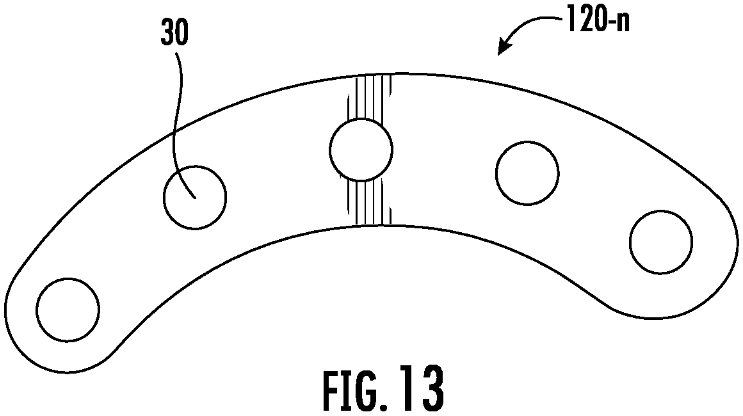
FIG. 13 illustrated another link suitable for assembling a hinged clamp as illustrated in FIG. 6; and, FIG. 14 illustrates a protective apparatus installed on a catalytic converter.

FIG. 13 illustrates a link 120 with five closed apertures.

Figure 14:
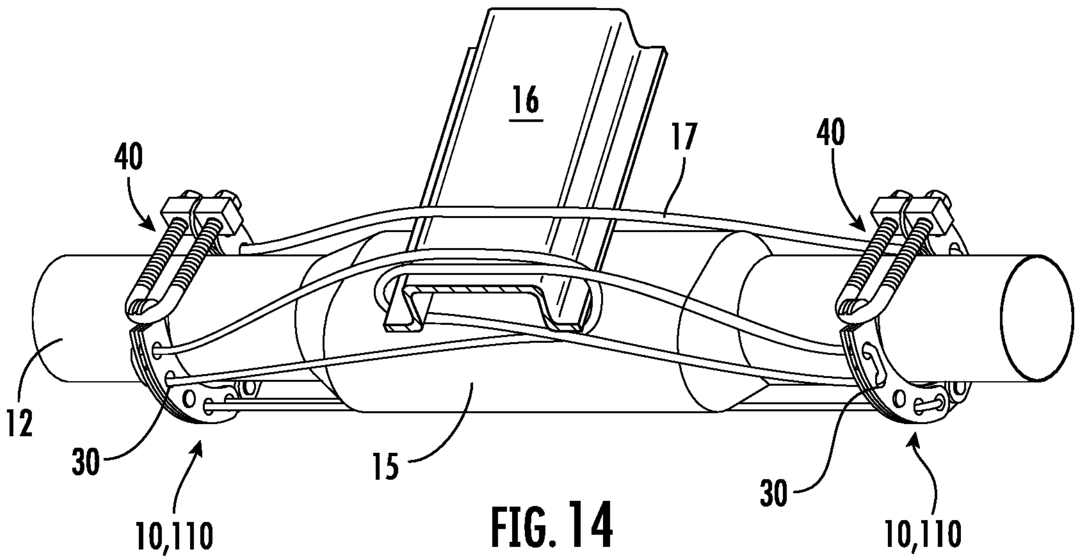

The use either clamp 10 or clamp 110 with a catalytic convertor will be explained with reference to FIG. 14. FIG. 14 illustrates a catalytic converter 15 with larger diameter pipes 12 at either end. The two hinged clamps 10, 110 are secured on the pipe 12 on either side of the catalytic converter 15. After the clamps are secured, a cable 17 is strung between the two clamps through the apertures 30 and around a frame component 16. The cable 17 passes through the apertures 30 and around the convertor to form a cage like structure around the converter and the ends of the cables are secured by a cable clamp or other fastening means. As a result, cutting the exhaust pipes 12 on either side of the catalytic converter 15 will not free the converter from the frame component 16 and a potential thief will be delayed or stopped from removing the converter. Additionally, the converter may be saved for reattachment to the system.

The sections of the clamps 10 and 110 may be made of stainless steel or another cut resistant metal. The cables are also made of a cut cur resistant material and may by wire rope such as that used for light duty cranes or overhead lifting clamps. In like manner, the closures 40 and 140 are formed from a cut resistant material.

The orientation of the hinged clamps will depend on the available space where the catalytic converter is located and the availability of an anchor position on the vehicle.

The tightening elements or nuts 45 and 147 are shown as hex nuts for purposes of illustration; however, other nuts, such McMaster-Carr temper-resistant, tri-grove nuts, may be used to enhance theft resistance by increasing the difficulty of trying to remove the clamps to free a convertor.

What is claimed is:

1. A clamp for an exhaust system, the clamp comprising:

a plurality of arcuate links, each arcuate link has a body portion with at least three apertures and a free end having a hook shape that extends beyond the at least three apertures and is configured to receive an arched closer;

a plurality of hinge pins that connect the plurality of arcuate links together in groups that are movable relative each other, such that each of the plurality of arcuate links are directly connected to at least one link of the plurality of arcuate links through the hinge pins, wherein two of the plurality of hinge pins are located in apertures that are at least one aperture removed from the free end; and, the closer is configured to draw the free ends together.

2. The clamp of claim 1, wherein:

the closer comprises two threaded shafts connected by an intermediate portion that is received in at least two arcuate link free ends and draws the free ends together.

3. The clamp of claim 2, wherein the closer is U-shaped.

4. The clamp of claim 2, wherein each link has a body portion with at least five equally sized apertures.

5. The clamp of claim 1, wherein the plurality of arcuate links are made of stainless steel.

6. The clamp of claim 1, wherein the closer is made of stainless steel.

7. The clamp of claim 1, wherein the plurality of links are joined in groups by the hinge pins.

8. The clamp of claim 7, wherein the clamp is made of stainless steel.

9. The clamp of claim 1, wherein the closer has two dependent threaded portions.

10. The clamp of claim 9, further comprising a securing collar having two portions joined by a divider, the two portions of the securing collar are spaced such that each portion receives one of the two threaded portions of the closer.

* * * * *